US012312926B2

(12) United States Patent
Guo et al.

(10) Patent No.: US 12,312,926 B2
(45) Date of Patent: May 27, 2025

(54) MULTI-COMPONENT SUPERCRITICAL THERMAL FLUID GENERATION SYSTEM AND METHOD WITH SEGMENTED AIR SUPPLY

(71) Applicant: XI'AN JIAOTONG UNIVERSITY, Xi'an (CN)

(72) Inventors: Liejin Guo, Xi'an (CN); Jialing Xu, Xi'an (CN); Zhiyong Peng, Xi'an (CN); Siqi Rong, Xi'an (CN); Hui Jin, Xi'an (CN); Di Su, Xi'an (CN); Zening Cheng, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 342 days.

(21) Appl. No.: 17/956,865

(22) Filed: Sep. 30, 2022

(65) Prior Publication Data

US 2023/0025498 A1 Jan. 26, 2023

Related U.S. Application Data

(63) Continuation of application No. PCT/CN2022/078442, filed on Feb. 28, 2022.

(30) Foreign Application Priority Data

Apr. 29, 2021 (CN) ......................... 202110472103.8

(51) Int. Cl.

*E21B 43/24* (2006.01)
*B01F 23/20* (2022.01)
*B01F 33/71* (2022.01)

(52) U.S. Cl.

CPC .............. *E21B 43/24* (2013.01); *B01F 23/29* (2022.01); *B01F 33/71* (2022.01)

(58) Field of Classification Search

CPC .. E21B 43/24; F22B 3/00; B01F 23/29; B01F 33/71

See application file for complete search history.

(56) References Cited

U.S. PATENT DOCUMENTS 10,411,180 B2 * 9/2019 O'Donnell .............. F22B 33/00
2012/0298356 A1 11/2012 Sladic
2019/0100984 A1 4/2019 Baird et al.

FOREIGN PATENT DOCUMENTS

CA 2374115 A1 9/2003
CN 102654048 A 9/2012

(Continued)

OTHER PUBLICATIONS

International Search Report (PCT /CN2022/078442); Date of Mailing: Jun. 1, 2022.

(Continued)

*Primary Examiner* — Gregory A Wilson
(74) *Attorney, Agent, or Firm* — Wiersch Law Group

(57) ABSTRACT

Present disclosure a multi-component supercritical thermal fluid generation system and method with segmented air supply. The outlet of a water tank is communicated with the preheated water inlet of a multi-component supercritical thermal fluid generator body, the preheated water outlet of the multi-component supercritical thermal fluid generator body is communicated with the cold fluid inlet of a heat exchanger, the product outlet at the upper part of the multi-component supercritical thermal fluid generator body is communicated with the thermal fluid inlet of the heat exchanger, and the slag outlet at the lower part of the multi-component supercritical thermal fluid generator body is communicated with the inlet of a slag discharge lock hopper. Through the reasonable coupling design of the supercritical water gasification heat absorption zone and the oxidation reaction heat release zone in the multi-component (Continued)

thermal fluid generator, the self-heating of the multi-component supercritical thermal fluid generation system is realized.

10 Claims, 2 Drawing Sheets

(56) References Cited

FOREIGN PATENT DOCUMENTS

| | | | | |
|---|---|---|---|---|
| CN | 202611674 | U | | 12/2012 |
| CN | 106640007 | A | | 5/2017 |
| CN | 208168858 | U | | 11/2018 |
| CN | 110013783 | A | | 7/2019 |
| CN | 113137217 | A | | 7/2021 |
| CN | 113294767 | A | | 8/2021 |
| CN | 218644268 | U | * | 3/2023 |
| CN | 116624134 | A | * | 8/2023 |
| WO | 2015155589 | A1 | | 10/2015 |

OTHER PUBLICATIONS

CN First Office Action(202110472103.8); Date of Mailing: Dec. 9, 2021.

* cited by examiner

MULTI-COMPONENT SUPERCRITICAL THERMAL FLUID GENERATION SYSTEM AND METHOD WITH SEGMENTED AIR SUPPLY

CROSS-REFERENCE TO RELATED APPLICATIONS

The present application is a continuation of International Application No. PCT/CN2022/078442, filed on Feb. 28, 2022, which claims priority to Chinese Application No. 202110472103.8, filed on Apr. 29, 2021, the contents of both of which are incorporated herein by reference in their entireties.

TECHNICAL FIELD

The present disclosure belongs to the technical field of heavy oil thermal recovery, and relates to supercritical water gasification technology, in particular to a multi-component supercritical thermal fluid generation system and method with segmented air supply.

BACKGROUND

With the continuous improvement of petroleum exploitation technology, some special reservoirs have attracted more and more attention of petroleum workers. Because of the large proportion of heavy oil in petroleum resources, how to exploit heavy oil and make it an available reserve is a problem that the petroleum industry has been exploring. In China, because of the serious heterogeneity of heavy oil reservoirs, many faults in geological structures, complicated oil-water system, high gum content in crude oil, many types of reservoirs, deep burial, high viscosity, high relative density, poor fluidity under formation conditions, and even the inability to flow under reservoir conditions, the exploitation of these heavy oil reservoirs requires constantly adopting new technologies, new ideas and new methods to explore the technical problems of heavy oil development, so as to meet the increasing domestic demand for energy.

Heavy oil has high viscosity and poor fluidity. Using the characteristic that the viscosity of heavy oil is very sensitive to temperature, the seepage resistance of oil layer can be reduced by increasing the temperature of heavy oil and decreasing the viscosity, so as to improve the recovery ratio of heavy oil. Since 1960s, the thermal recovery technology of heavy oil has developed rapidly. Up to now, heavy oil thermal recovery technology with steam huff and puff, steam flooding, burning oil layer and the like as the main recovery methods has been formed, and good recovery results have been achieved. The above heavy oil thermal recovery technology has been widely used in the development of most land heavy oil reservoirs at home and abroad. Compared with onshore heavy oil fields, offshore heavy oil fields have larger oil well spacing, deeper buried oil layers, and the steam flooding operation cannot be carried out continuously. In addition, offshore platforms have narrow space and limited bearing capacity, so offshore oil fields cannot be widely popularized. For the offshore thermal recovery technology of heavy oil, new thermal recovery technology and supporting technology is urgently needed to be developed to improve the heavy oil recovery efficiency. As a new thermal recovery technology of heavy oil, the multi-component thermal fluid huff and puff technology mainly injects the multi-component thermal fluid into oil wells to reduce the viscosity of the crude oil near the wellbore, reduce the formation seepage resistance and improve the liquid production capacity of oil wells. In 2008, on the basis of extensive research on existing heavy oil thermal recovery technology, CNOOC first carried out the pilot experiment of multi-component thermal fluid huff and puff technology in offshore heavy oil fields in the south zone of Nanpu Oilfield, Bohai Sea, and achieved good heavy oil production increase effect.

The working principle of the traditional multi-component thermal fluid generation system is to fix the high-pressure combustion chamber in the engine room by using the combustion jet mechanism of the space rocket engine, and the mixed gas of high-temperature and high-pressure water vapor, carbon dioxide, nitrogen and the like generated after ignition and combustion is directly injected into the oil layer, thereby increasing the oil layer pressure, reducing the oil layer viscosity, increasing the swept zone of oil displacement, and achieving the purpose of enhancing oil recovery.

However, the current multi-component thermal fluid generator relies heavily on diesel, which is costly. The complicated water treatment process makes it impossible to directly use platform wastewater such as heavy oil production water; because of the single air supply mode, the combustion temperature is high, the local high temperature zone of the reactor is seriously corroded and the heat dissipation is serious. Supercritical water refers to water whose temperature and pressure both exceed its critical point (the critical temperature is 374° C., and the critical pressure is 22.1 MPa). The supercritical water gasification technology is a technology that uses the excellent physical and chemical properties of supercritical water, such as high diffusivity, high solubility and low viscosity, to convert various organic substances into clean energy such as hydrogen, and no $NO_X$ and $SO_X$ are produced during supercritical water gasification process.

SUMMARY

The purpose of the present disclosure is to overcome the above shortcomings of the prior art by providing a multi-component supercritical thermal fluid generation system and method with segmented air supply.

In order to achieve the above purpose, the present disclosure adopts the following technical solution:

A multi-component supercritical thermal fluid generation system with segmented air supply, including a multi-component supercritical thermal fluid generator body, a heat exchanger, a gas-liquid separator, a water tank, a storage tank, a slag discharge lock hopper and an air compressor. A preheated water inlet of the multi-component supercritical thermal fluid generator body is communicated with the water tank; a preheated water outlet of the multi-component supercritical thermal fluid generator body is communicated with a cold fluid inlet of the heat exchanger; a heat exchange sleeve is arranged in the multi-component supercritical thermal fluid generator body, an air delivery pipe is arranged in the heat exchange sleeve, and a spiral pipe is wound around the air delivery pipe; the cold fluid outlet of the heat exchanger is communicated with an inlet of the spiral pipe, and an outlet of the spiral pipe is communicated with a preheated water inlet of the heat exchange sleeve; an outlet of the storage tank is communicated with a material inlet provided on the multi-component supercritical thermal fluid generator body; an outlet of the air compressor is respectively communicated with an upper air inlet and a lower air inlet of the air delivery pipe; a product outlet at an upper part of the multi-component supercritical thermal fluid generator body is communicated with a thermal fluid inlet of the heat exchanger, and a slag outlet at a lower part is communicated with an inlet of the slag discharge lock hopper; a thermal fluid outlet of that heat exchange is divided into two path, one path is communicated with the gas-liquid separator through a cooler, and the other path is connected with an inlet of a multi-component supercritical thermal fluid injection well; a liquid product outlet of the gas separator is communicated with an inlet of the water tank.

The multi-component supercritical thermal fluid generator body is internally provided with an air supply unit, so as to realize segmented air supply in the multi-component supercritical thermal fluid generator body. A further improvement of the present disclosure is that:

An outlet of the water tank is communicated with the preheated water inlet of the multi-component supercritical thermal fluid generator body through a preheated water pump.

The outlet of the storage tank is communicated with the material inlet through a material pump, and the material inlet is provided on a cooling wall in the multi-component supercritical thermal fluid generator body.

A multi-component supercritical thermal fluid generator cooling zone is located between an inner wall of the multi-component supercritical thermal fluid generator body and the cooling wall, a supercritical water gasification heat absorption zone is located between the cooling wall and the heat exchange sleeve, and an inner cavity of the heat exchange sleeve is an oxyhydrogen heat release zone.

A first flow valve is arranged between an outlet of the air compressor and an upper air inlet of the air delivery pipe, and a second flow valve is arranged between the outlet and the lower air inlet.

The air supply unit is arranged on the air delivery pipe in the multi-component supercritical thermal fluid generator body, and the air supply unit is provided with a first air outlet, a second air outlet, a third air outlet and a fourth air outlet from top to bottom on the air delivery pipe in sequence.

The air supply unit is connected with the upper air inlet and the lower air inlet of the multi-component supercritical thermal fluid generator body through the two outlets of the air compressor, and the air supply unit is an upper air outlet and a lower air outlet formed inside the multi-component supercritical thermal fluid generator body.

The air supply unit is in a form of air spiral delivery pipes in the heat exchange sleeve, and there are several air spiral delivery pipes, which are uniformly distributed on a central axis of the heat exchange sleeve.

An outer wall of the multi-component supercritical thermal fluid generator body is provided with a first auxiliary heating device, a second auxiliary heating device and a third auxiliary heating device from top to bottom in sequence.

A multi-component supercritical thermal fluid generation method with segmented air supply includes the following steps:

1) Preparing materials by a material preparation device, and then feeding the prepared materials into a material storage tank.
2) Closing a high temperature stop valve.
3) Transporting water in the water tank by the preheated water pump and the water flowing into the multi-component supercritical thermal fluid generator cooling zone; the preheated water flowing out of the preheated water outlet of the multi-component supercritical thermal fluid generator body flowing into the supercritical water gasification heat absorption zone through the heat exchanger and the spiral pipe; the system adjusting a system pressure through a back pressure valve so that the system pressure is stably maintained above a supercritical pressure.
4) Starting the first auxiliary heating device, the second auxiliary heating device and the third auxiliary heating device, and the cold water delivered by the preheated water pump passing through the multi-component supercritical thermal fluid generator cooling zone, the heat exchanger and the spiral pipe to be heated to a supercritical state.
5) Transporting the materials stored in the storage tank, after pressure boost by the material pump (5), to the supercritical water gasification heat absorption zone for supercritical water gasification reaction; a mixture of gas products and supercritical water produced by the reaction entering the heat exchanger through a product outlet of the multi-component supercritical thermal fluid generator body for heat exchange, then entering the cooler for further cooling, and finally entering the gas-liquid separator for gas-liquid separation. The separated gas products are recycled, and the separated liquid is returned to the water tank.
6) After the whole system runs continuously and stably for a period of time, starting the air compressor and opening the first flow valve or the second flow valve, the air in the air compressor passing through the air supply unit and undergoing a hydrogen-oxygen exothermic reaction with a supercritical water gasification product H2 in a reaction cavity enclosed by the heat exchange sleeve; transferring the released heat to the supercritical water gasification heat absorption zone enclosed by the cooling wall and the heat exchange sleeve by the heat exchange sleeve, so as to achieve the purpose of energy coupling and matching between the supercritical water gasification heat absorption zone and the oxyhydrogen heat release zone; with the progress of the reaction, gradually increasing an air flow rate to a certain constant value, while reducing the heating powers of the first auxiliary heating device, the second auxiliary heating device and the third auxiliary heating device until heating is completely stopped, thus realizing the self-heating of the system and keeping the system running continuously and stably.
7) After the multi-component supercritical thermal fluid generation system runs continuously and stably for a period of time, closing the back pressure valve and opening the high-temperature stop valve, so that a multi-component supercritical thermal fluid with a high temperature and a high pressure generated by the system can be continuously injected into an oil layer through the multi-component supercritical thermal fluid injection well.
8) Discharging inorganic salts precipitated in the reaction process from the multi-component supercritical thermal fluid generator regularly through the slag discharge lock hopper to prevent blockage in the multi-component supercritical thermal fluid generator.

Compared with the prior art, the present disclosure has the following beneficial effects.

The present disclosure has wide material adaptability, can realize the resource utilization and harmless utilization of organic waste oils, thus greatly reduces the dependence on diesel oil, and reduces the operation cost. According to the present disclosure, the air is highly dispersed in the oxidation reaction zone of the multi-component supercritical thermal fluid by segmented air supply, so that the reaction rate can be effectively controlled, the heat generated by the whole oxidation heat release is uniformly distributed in space, and no high-temperature hot spot is generated, thereby realizing the mild and stable generation of the multi-component supercritical thermal fluid. According to the present disclosure, the investment and operation cost of electric heating equipment are reduced through the reasonable energy coupling arrangement of the supercritical water gasification heat absorption zone and the oxyhydrogen heat release zone.

In the concrete operation of the present disclosure, the high-temperature stop valve is closed first, the material is prepared by the material preparation device, and then the prepared material is transported to the supercritical water gasification heat absorption zone formed by the cooling wall and the heat exchange sleeve by the material pump, and the gasification endothermic reaction with the supercritical water takes place, and gases such as $H_2$ and $CO_2$ are generated. After the system runs stably for a period of time, air is introduced, so that hydrogen-oxygen exothermic reaction occurs in the heat exchange sleeve and a large amount of heat is released, and the released heat is transferred to the supercritical water gasification heat absorption zone between the cooling wall and the heat exchange sleeve through the heat exchange sleeve. Then the air flow rate is gradually increased to a certain constant value, and the heating power of the heat source is gradually reduced until the heating is completely stopped, and the whole system runs continuously and stably. After the system continues to run stably for a period of time, the back pressure valve is closed and the high-temperature stop valve is opened, so that the generated multi-component supercritical thermal fluid can be continuously injected into the oil layer through the multi-component supercritical thermal fluid injection well. The product at the outlet of the multi-component supercritical thermal fluid generator body exchanges heat with the cold water from the water tank, so as to realize the recycling of heat. The inorganic salt generated in the reaction process is regularly discharged out of the multi-component supercritical thermal fluid generator through the slag discharge lock hopper to prevent the system from blocking.

In the figures: 1—Air compressor; 2—Second flow valve; 3—First flow valve; 4—Storage tank; 5—Material pump; 6—Heat exchanger; 7—Multi-component thermal fluid injection well; 8—High temperature stop valve; 9—Cooler; 10—Back pressure valve; 11—Gas-liquid separator; 12—Water tank; 13—Preheated water pump; 14—Slag discharge lock hopper; 15—Heat exchange sleeve; 16—Spiral pipe; 17—Air delivery pipe; 18—First air outlet; 19—Second air outlet; 20—Third air outlet; 21—Fourth air outlet; 22—Multi-component thermal fluid generator body; 23—First auxiliary heating device; 24—Second auxiliary heating device; 25—Third auxiliary heating device; 26—Cooling wall.

DESCRIPTION OF EMBODIMENTS

Figure 1:
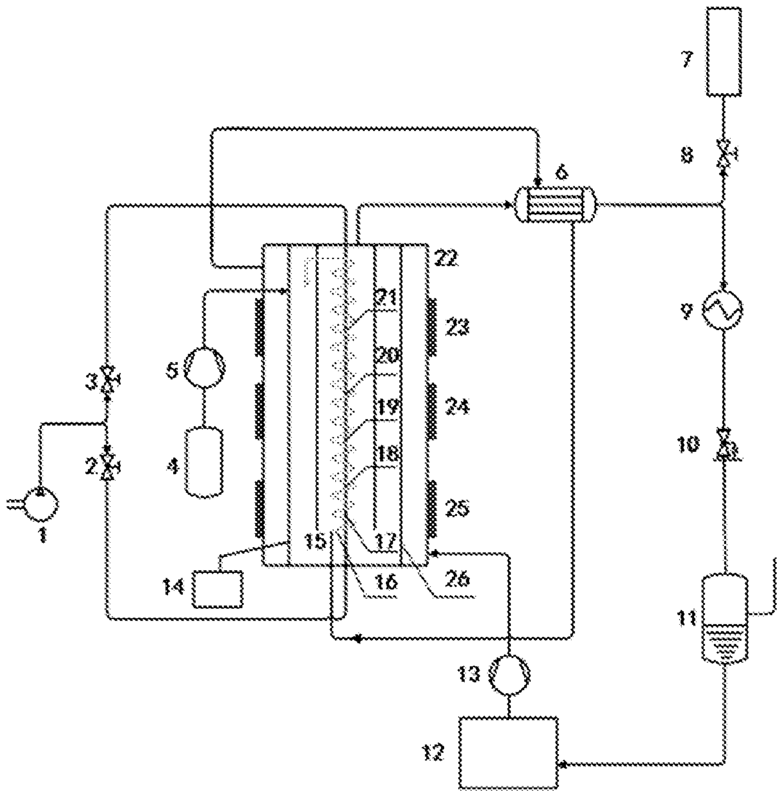
FIG. 1 is a schematic structural diagram of the present disclosure.

The present disclosure will be further described below in detail with reference to the drawings:

Referring to FIG. 1, a continuous multi-component supercritical thermal fluid generating self-heating system of the present disclosure includes a multi-component supercritical thermal fluid generator body 22, a heat exchanger 6, a cooler 9, a gas-liquid separator 11, a storage tank 4, a slag discharge lock hopper 14, a heat exchange sleeve 15, a spiral pipe 16, a first auxiliary heating device 23, a second auxiliary heating device 24, a third auxiliary heating device 25, an air delivery pipe 17, an air compressor 1 and a water tank 12.

The outlet of the water tank 12 is communicated with the preheated water inlet of the multi-component supercritical thermal fluid generator body 22, the preheated water outlet of the multi-component supercritical thermal fluid generator body 22 is communicated with the cold fluid inlet of the heat exchanger 6, the cold fluid outlet of the heat exchanger 6 is communicated with the inlet of the spiral pipe 16, the outlet of the spiral pipe 16 is communicated with the preheated water inlet of the heat exchange sleeve 15, and the outlet of the storage material 4 is communicated with the material inlet of the multi-component supercritical thermal fluid generator body 22; the outlet of the compressor 1 is communicated with the upper air inlet and the lower air inlet of the air delivery pipe 17, the product outlet of the multi-component supercritical thermal fluid generator body 22 is communicated with the thermal fluid inlet of the heat exchanger 6, the slag outlet of the lower part of the multi-component supercritical thermal fluid generator body 22 is communicated with the inlet of the slag discharge lock hopper 14, the thermal fluid outlet of the heat exchanger 6 is communicated with the inlet of the cooler 9 and the inlet of the multi-component supercritical thermal fluid injection well 7, the outlet of the cooler 9 is communicated with the inlet of the gas-liquid separator 11, and the liquid product outlet of the gas-liquid separator 11 is communicated with the inlet of the water tank 12.

The multi-component supercritical thermal fluid generator body 22 is internally provided with an air supply unit, so as to realize segmented air supply in the multi-component supercritical thermal fluid generator body 22.

The outlet of the water tank 12 is communicated with the preheated water inlet of the multi-component supercritical thermal fluid generator body 22 through the preheated water pump 13; the outlet of the storage tank 4 is communicated with the material inlet of the cooling wall 26 through the material pump 5; a first flow valve 3 and a second flow valve 2 are respectively arranged between the outlet of the air compressor 1 and the upper air inlet and the lower air inlet of the air delivery pipe 17; a back pressure valve 10 is arranged between the cooler 9 and the gas-liquid separator 11; a high-temperature stop valve 8 is arranged between the heat exchanger 6 and the multi-component supercritical thermal fluid injection well 7; a first auxiliary heating device 23, a second auxiliary heating device 24, and a third auxiliary heating device 25 are arranged on the outer wall of the multi-component fluid generator body 22. The air supply unit is arranged on the air delivery pipe (17) in the multi-component supercritical thermal fluid generator body 22. The air supply unit is composed of a first air outlet 18, a second air outlet 19, a third air outlet 20 and a fourth air outlet 21 which are sequentially arranged on the air delivery pipe 17 from top to bottom.

The multi-component supercritical thermal fluid generation method with segmented air supply of that application includes the following step:

1) Preparing materials by a material preparation device, and then feeding the prepared materials into a material storage tank 4.

2) Closing a high temperature stop valve 8.
3) Transporting water in the water tank 12 by the preheated water pump 13 and the water flowing into the multi-component supercritical thermal fluid generator cooling zone; the preheated water flowing out of the preheated water outlet of the multi-component supercritical thermal fluid generator body 22 flowing into the supercritical water gasification heat absorption zone through the heat exchanger 6 and the spiral pipe 16; the system adjusting a system pressure through a back pressure valve 10 so that the system pressure is stably maintained above a supercritical pressure.
4) Starting the first auxiliary heating device 23, the second auxiliary heating device 24 and the third auxiliary heating device 25, and the cold water delivered by the preheated water pump 13 passing through the multi-component supercritical thermal fluid generator cooling zone, the heat exchanger 6 and the spiral pipe to be heated to a supercritical state.
5) Transporting the materials stored in the storage tank (4), after pressure boost by the material pump 5, to the supercritical water gasification heat absorption zone for supercritical water gasification reaction; a mixture of gasification products and supercritical water produced by the reaction entering the heat exchanger 6 through a product outlet of the multi-component supercritical thermal fluid generator body 22 for heat exchange, then entering the cooler 9 for further cooling, and finally entering the gas-liquid separator 11 for gas-liquid separation. The separated gas products are recycled, and the separated liquid is returned to the water tank 12.
6) After the whole system runs continuously and stably for a period of time, the air compressor 1 is started and the first flow valve 3 or the second flow valve 2 is opened, the air in the air compressor 1 passes through the air supply unit and undergoes an exothermic oxidation reaction with a supercritical water gasification product $H_2$ through the air supply unit in a reaction cavity enclosed by the heat exchange sleeve 15; the released heat by oxidation reaction is transferred to the supercritical water gasification heat absorption zone enclosed by the cooling wall 26 and the heat exchange sleeve 15 by the heat exchange sleeve 15, so as to achieve the purpose of energy coupling and matching between the supercritical water gasification heat absorption zone and the oxidation reaction heat release zone. As the reaction occurs, an air flow rate to a certain constant value gradually increases, and meanwhile the heating powers of the first auxiliary heating device 23, the second auxiliary heating device 24 and the third auxiliary heating device 25 reduce until heating is completely stopped, thus realizing the self-heating of the system and keeping the system running continuously and stably.
7) After the multi-component supercritical thermal fluid generation system runs continuously and stably for a period of time, closing the back pressure valve 10 and opening the high-temperature stop valve 8, so that a multi-component supercritical thermal fluid generated by the system can be continuously injected into an oil layer through the multi-component supercritical thermal fluid injection well 7.
8) Discharging inorganic salts precipitated in the reaction process from the multi-component supercritical thermal fluid generator regularly through the slag discharge lock hopper 14 to prevent blockage in the multi-component supercritical thermal fluid generator.

During operation, the present disclosure can flexibly select upper air entry or lower air entry by adjusting the first flow valve 3 and the second flow valve 2. The present disclosure has wide material applicability, and can directly use offshore platform organic wastewater such as heavy oil production water as materials to realize harmless treatment and resource utilization of offshore platform organic wastewater.

According to the present disclosure, the multi-component supercritical thermal fluid generator cooling zone enclosed by the multi-component supercritical thermal fluid generator 22 and the cooling wall 26 can preheat the cold water delivered from the water tank 12 through the preheated water pump 13, reduce the wall temperature of the multi-component supercritical thermal fluid generator 22, and reduce the material requirements for the multi-component supercritical thermal fluid generator 22. Through reasonable energy coupling arrangement of the supercritical water gasification heat absorption zone and hydrogen-oxygen heat release zone, the self-heating of the multi-component supercritical thermal fluid generation system can be realized, and the high equipment investment and operation cost caused by electric heating equipment can be reduced.

The auxiliary heating device of that application can also be one or more heating mode such as solar heating, electromagnetic wave heating, industrial waste heat and the like. Of course, its purpose is to make the water entering the multi-component supercritical thermal fluid generator 22 reach the supercritical state, and its form is not limited to any mode.

Embodiment 1

Figure 2:
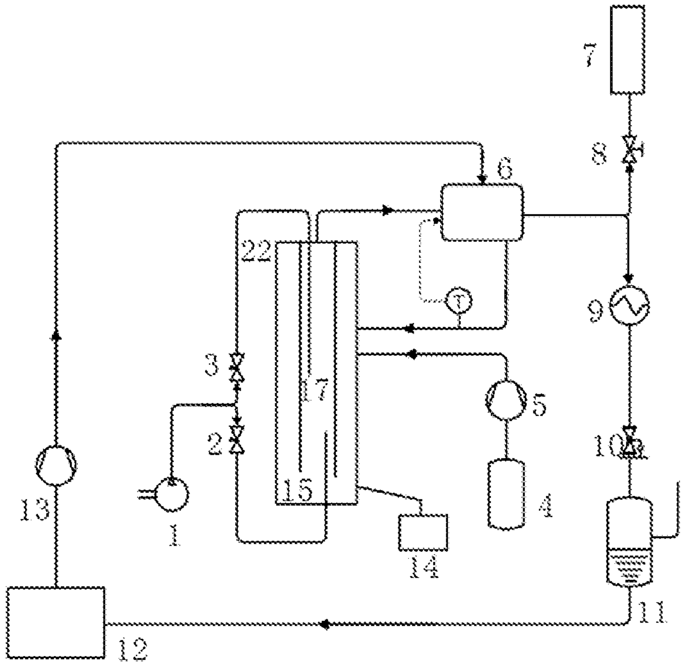
FIG. 2 is a structural diagram of Embodiment 1 of the present disclosure.

As shown in FIG. 2, in the embodiment, the multi-component supercritical thermal fluid generator main body 22 is internally provided with a heat exchange sleeve 15; the preheated water inlet of the multi-component supercritical thermal fluid generator body 22 is communicated with the cold fluid outlet of a heat recovery and temperature regulation device 6, and the cold fluid inlet of the heat recovery and temperature regulation device 6 is communicated with the outlet of the water tank 12; the material inlet of the multi-component supercritical thermal fluid generator body 22 is connected with the storage tank 4; the product outlet at the upper part of the multi-component supercritical thermal fluid generator body 22 is communicated with the thermal fluid inlet of the heat recovery and temperature regulation device 6, and the slag outlet at the lower part of the multi-component supercritical thermal fluid generator body 22 is connected with the slag discharge device 14; the thermal fluid outlet of that heat recovery and temperature regulation device 6 is divided into two paths, one path is communicated with the gas-liquid separator 11 through the cooler 9, and the other path is communicated with the multi-component supercritical thermal fluid injection well 7; the liquid product outlet of the gas-liquid separator 11 is communicated with the inlet of the water tank 12.

In this embodiment, the upper air inlet and the lower air inlet of the multi-component supercritical thermal fluid generator body 22 are both connected with the outlet of the air compressor 1; the air of the air compressor 1 evenly reacts with the supercritical water gasification product H2 through the upper air inlet and the lower air inlet in the reaction cavity enclosed by the heat exchange sleeve 15.

The air supply unit of this embodiment is connected to the upper air inlet and the lower air inlet of the multi-component supercritical thermal fluid generator body 22 through the outlets at both ends of the air compressor 1. The air supply units are the upper air outlet and the lower air outlet formed inside the multi-component supercritical thermal fluid generator body 22. The segmented supply of air in the multi-component supercritical thermal fluid generator body 22 is realized.

Embodiment 2

Figure 3:
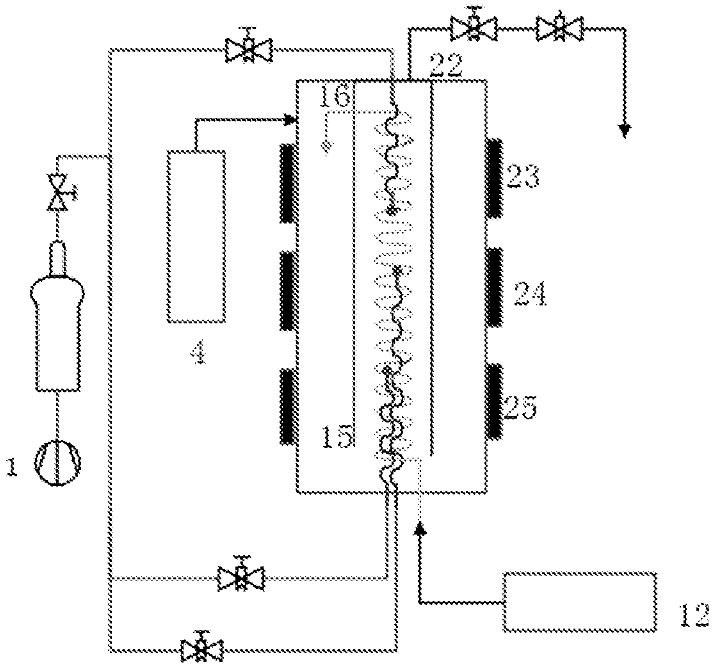
FIG. 3 is a structural diagram of Embodiment 2 of the present disclosure.

As shown in FIG. 3, the heat exchange sleeve 15 is arranged in the multi-component supercritical thermal fluid generator body 22, and the heat exchange sleeve 15 is internally provided with a plurality of air spiral delivery pipes, which are evenly distributed on the central axis of the heat exchange sleeve 15, and the preheated water heat exchange spiral pipe 16 runs through the heat exchange sleeve 15, and the preheated water heat exchange spiral pipe 16 is wound around the outer walls of the air spiral delivery pipes.

In this embodiment, the air supply unit takes the form of air spiral delivery pipes in the heat exchange sleeve 15, and there are several air spiral delivery pipes, which are evenly distributed on the central axis of the heat exchange sleeve 15, so as to realize the segmented air supply in the multi-component supercritical thermal fluid generator body 22. The above contents only illustrate the technical idea of the present disclosure, and but are not intended to limit the protection scope of the present disclosure. Any changes made on the basis of the technical solution according to the technical idea put forward by the present disclosure fall within the protection scope of the claims of the present disclosure.

What is claimed is:

1. A multi-component supercritical thermal fluid generation system with segmented air supply, comprising a multi-component supercritical thermal fluid generator body (22), a heat exchanger (6), a gas-liquid separator (11), a water tank (12), a storage tank (4), a slag discharge lock hopper (14) and an air compressor (1); wherein a preheated water inlet of the multi-component supercritical thermal fluid generator body (22) is communicated with the water tank (12); a preheated water outlet of the multi-component supercritical thermal fluid generator body (22) is communicated with a cold fluid inlet of the heat exchanger (6); a heat exchange sleeve (15) is provided in the multi-component supercritical thermal fluid generator body (22), an air delivery pipe (17) is provided in the heat exchange sleeve (15), and a spiral pipe (16) is wound around the air delivery pipe (17); a cold fluid outlet of the heat exchanger (6) is communicated with an inlet of the spiral pipe (16), and an outlet of the spiral pipe (16) is communicated with a preheated water inlet of the heat exchange sleeve (15); an outlet of the storage tank (4) is communicated with a material inlet provided on the multi-component supercritical thermal fluid generator body (22); an outlet of the air compressor (1) is respectively communicated with an upper air inlet and a lower air inlet of the air delivery pipe (17); a product outlet at an upper part of the multi-component supercritical thermal fluid generator body (22) is communicated with a thermal fluid inlet of the heat exchanger (6), and a slag outlet at a lower part is communicated with an inlet of the slag discharge lock hopper (14); a thermal fluid outlet of that heat exchange (6) is divided into two path, one path is communicated with the gas-liquid separator (11) through a cooler (9), and the other path is connected with an inlet of a multi-component supercritical thermal fluid injection well (7); a liquid product outlet of the gas separator (11) is communicated with an inlet of the water tank (12);

an air supply unit is provided in the multi-component supercritical thermal fluid generator body (22), so as to realize segmented air supply in the multi-component supercritical thermal fluid generator body (22).

2. The multi-component supercritical thermal fluid generation system with segmented air supply according to claim 1, wherein an outlet of the water tank (12) is communicated with the preheated water inlet of the multi-component supercritical thermal fluid generator body (22) through a preheated water pump (13).

3. The multi-component supercritical thermal fluid generation system with segmented air supply according to claim 1, wherein the outlet of the storage tank (4) is communicated with the material inlet through a material pump (5), and the material inlet is provided on a cooling wall (26) in the multi-component supercritical thermal fluid generator body (22).

4. The multi-component supercritical thermal fluid generation system with segmented air supply according to claim 3, wherein a multi-component supercritical thermal fluid generator cooling zone is located between an inner wall of the multi-component supercritical thermal fluid generator body (22) and the cooling wall (26), a supercritical water gasification heat absorption zone is located between the cooling wall (26) and the heat exchange sleeve (15), and an inner cavity of the heat exchange sleeve (15) is an oxidation reaction heat release zone.

5. The multi-component supercritical thermal fluid generation system with segmented air supply according to claim 4, wherein a first flow valve (3) is provided between an outlet of the air compressor (1) and the upper air inlet of the air delivery pipe (17), and a second flow valve (2) is provided between the outlet of the air compressor (1) and the lower air inlet of the air delivery pipe (17).

6. The multi-component supercritical thermal fluid generation system with segmented air supply according to claim 1, wherein the air supply unit is provided at the air delivery pipe (17) in the multi-component supercritical thermal fluid generator body (22), and the air supply unit comprises a first air outlet (18), a second air outlet (19), a third air outlet (20) and a fourth air outlet (21) provided at the air delivery pipe from bottom to top (17) in sequence.

7. The multi-component supercritical thermal fluid generation system with segmented air supply according to claim 1, wherein the air supply unit is connected with an upper air inlet and a lower air inlet of the multi-component supercritical thermal fluid generator body (22) through the outlet of the air compressor (1), and the air supply unit comprises an upper air outlet and a lower air outlet formed inside the multi-component supercritical thermal fluid generator body (22).

8. The multi-component supercritical thermal fluid generation system with segmented air supply according to claim 1, wherein the air supply unit is in a form of an air spiral delivery pipe in the heat exchange sleeve (15), and there are several air spiral delivery pipes which are uniformly distributed on a central axis of the heat exchange sleeve (15).

9. The multi-component supercritical thermal fluid generation system with segmented air supply according to claim 1, wherein an outer wall of the multi-component supercritical thermal fluid generator body (22) is provided with a first auxiliary heating device (23), a second auxiliary heating device (24) and a third auxiliary heating device (25) from top to bottom in sequence.

10. A multi-component supercritical thermal fluid generation method with segmented air supply using the system according to claim 1, comprising the following steps:

1) preparing materials by a material preparation device, and then feeding prepared materials into a material storage tank (4);
2) closing a high temperature stop valve (8);
3) transporting water in the water tank (12) by the preheated water pump (13) and the water flowing into a multi-component supercritical thermal fluid generator cooling zone; the preheated water flowing out of the preheated water outlet of the multi-component supercritical thermal fluid generator body (22) flowing into the supercritical water gasification heat absorption zone through the heat exchanger (6) and the spiral pipe (16); the system adjusting a system pressure through a back pressure valve (10) so that the system pressure is stably maintained above a supercritical pressure;
4) starting the first auxiliary heating device (23), the second auxiliary heating device (24) and the third auxiliary heating device (25), and the cold water delivered by the preheated water pump (13) passing through the multi-component supercritical thermal fluid generator cooling zone, the heat exchanger (6) and the spiral pipe to be heated to a supercritical state;
5) transporting the materials stored in the storage tank (4), after pressure boost by the material pump (5), to the supercritical water gasification heat absorption zone where supercritical water gasification reaction occurs; a mixture of gas products and supercritical water produced by the reaction entering the heat exchanger (6) through a product outlet of the multi-component supercritical thermal fluid generator body (22) to exchange heat, then entering the cooler (9) to be cooled, and finally entering the gas-liquid separator (11) for gas-liquid separation; wherein separated gas products are recycled, and separated liquid returns to the water tank (12);
6) starting the air compressor (1) and opening the first flow valve (3) or the second flow valve (2) after the whole system runs continuously and stably for a period of time, wherein the air in the air compressor (1) passes through the air supply unit and undergoes oxidation exothermic reactions with the supercritical water gasification product H2 in a reaction cavity enclosed by the heat exchange sleeve (15); transferring the released heat to the supercritical water gasification heat absorption zone enclosed by the cooling wall (26) and the heat exchange sleeve (15) by the heat exchange sleeve (15), so as to achieve the purpose of energy coupling and matching between the supercritical water gasification heat absorption zone and the oxidation reaction heat release zone; with the progress of the reaction, gradually increasing an air flow rate to a certain constant value, and meanwhile reducing the heating powers of the first auxiliary heating device (23), the second auxiliary heating device (24) and the third auxiliary heating device (25) until heating is completely stopped, so as to achieve self-heating of the system and keeping the system running continuously and stably;
7) closing the back pressure valve (10) and opening the high-temperature stop valve (8) after the multi-component supercritical thermal fluid generation system runs continuously and stably for a period of time, so that the multi-component supercritical thermal fluid generated by the system is continuously injected into an oil layer through the multi-component supercritical thermal fluid injection well (7); and
8) discharging inorganic salts precipitated in the reaction process from the multi-component supercritical thermal fluid generator regularly through the slag discharge lock hopper (14) to prevent blockage in the multi-component supercritical thermal fluid generator.

* * * * *